Oct. 6, 1953  E. P. BULLARD  2,654,640
WAY CONSTRUCTION
Filed June 30, 1949

INVENTOR.
EDWARD PAYSON BULLARD
BY
*Paul M. Grist*
ATTORNEY

Patented Oct. 6, 1953

2,654,640

UNITED STATES PATENT OFFICE 2,654,640

WAY CONSTRUCTION

Edward Payson Bullard, Fairfield, Conn., assignor to The Bullard Company, a corporation of Connecticut Application June 30, 1949, Serial No. 102,253

4 Claims. (Cl. 308—3)

This invention relates to bearings in general, and particularly to a new and improved construction of a way bearing and its support.

The prime function of a machine bed or support is to support the various components of the machine adequately and to dampen vibrations that may be set up in the various components during operation. It has long been known that soft cast iron, i. e., one having a relatively high graphitic carbon content wherein the graphite flakes are uniformly arranged and of substantial size, possesses excellent vibration-dampening qualities. Such case iron, therefore, is highly desirable for machine beds and supports for the various components of the machine. Particularly is such a cast iron desirable as a machine tool bed or support where vibrations tend to cause chatter of the tool and work during machining operations on metal.

In the past, and particularly in the machine tool field, bearing ways have been cast integrally with the bed or support. The soft cast iron above-referred-to was unsuitable to machine into ways along which component parts of the machine tool were adapted to slide because it lacked adequate wear-resisting properties and invariably large blow holes were opened when such soft iron was machined. Accordingly, compromises were made in the bed or support casting to produce a better surface for machining into passable ways. Usually, a cast iron having as low a graphitic carbon content as possible was employed so that as close or refined a grain structure as possible was produced throughout, including the locations of the bearing ways. In addition, it was the frequent practice to chill these close-grained castings at the locations of the bearing ways to further refine the grain structure at these points. While these processes to some extent produced an iron structure suitable for machining into a bearing way, they did so at the expense of machinability. Close-grained iron is exceedingly difficult to machine, rendering tool life relatively short. And, all such bearing ways require hand scraping which, in itself, is an exceedingly costly and time-consuming process.

Cylindrical bars have been employed in the past as way bearings. Prior known constructions support these bars at spaced intervals, which spacing limits the travel of the carriage for which the way bars are intended. Such constructions are not satisfactory because the way bars deflect between their supports even due to their own weight, not to mentioned that of the carriage and loads applied to it.

The principal object of this invention is to provide a way bearing construction that will overcome the above, as well as other disadvantages of prior known way bearing constructions.

Other objects of the invention include the provision of a combined support and slide bearing construction in which a material can be employed for the bed or support that will possess the most desirable characteristics for strength and vibration-dampening, and a way bearing that will possess the utmost in hardness and accuracy with regard to its wearing surface; the provision of a bearing way construction in which forces acting in opposite directions are absorbed by way bearings of substantially identical construction that are independent of the bed or support therefor; the provision of such a way bearing in which a cylindrical bar is rigidly attached to a V-groove in a bed or support; the provision of a way bearing involving a pair of accurately machined cylindrical bars rigidly attached to a bed or support within grooves extending throughout the length of the bars; the provision of a way bearing construction including a pair of opposed, cylindrical way bars and a single gib for tightening the bearings on each bar simultaneously; and the provision of a way bearing construction that will eliminate the steps in casting and machining way bearings such as those necessary to produce a close-grained iron, those necessary to chill the casting in the location of way bearings, and those necessary to scrape the ways.

Other objects and novel features of the invention will become apparent from the following specification and accompanying drawing, in which.

Figure 1:
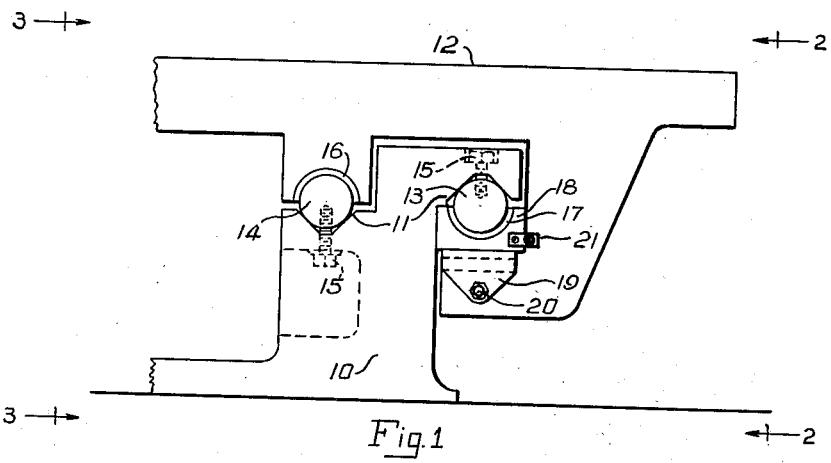
Fig. 1 is an end elevational view of a machine tool bed and reciprocable saddle to which the principles of the invention have been applied.
Figure 2:
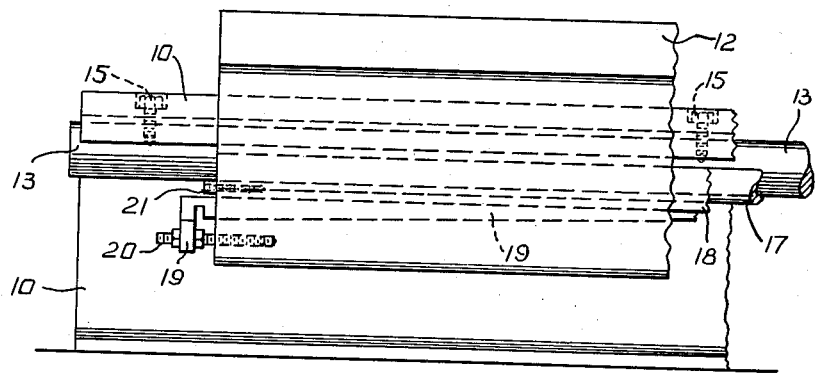
Fig. 2 is a side elevational view of the structure shown in Fig. 1 while looking in the direction of the arrows 2—2 of Fig. 1.
Figure 3:
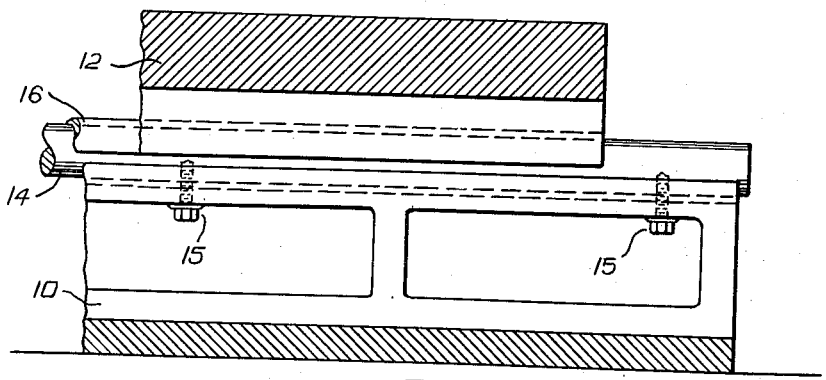
Fig. 3 is a view similar to Fig. 2, but looking in the direction of the arrows 3—3 of Fig. 1.

Referring to the drawing, the principles of the invention are shown and will be described as applied to a machine tool bed and saddle, although they can be applied with equal facility to any type of slide bearing in any type of machine.

Although the bed or support 10 may be made of any desired material, as a machine tool bed, it is preferably made from a cast iron that possesses maximum vibration-dampening qualities, i. e., one having a relatively large grain structure and a relatively high graphitic carbon content, Opposed grooves 11 are formed in the base 10 and extend throughout the path of travel of the saddle 12. These grooves are disclosed as V-grooves; however, semi-cylindrical grooves are contemplated within the scope of the invention. Hardened, accurately-ground, cylindrical bars 13 and 14 are rigidly attached to the bed 10 in the grooves 11 by screws 15. In each case, the bars 13, 14 are attached in a manner to provide uninterrupted bearing surfaces so that no chips can collect in recesses in the bearing surface which would damage the bearing. The bars 13, 14 may have other configurations, but that shown is the most economical to produce accurately. The bars 13, 14 may be of any convenient length and a series of such bars may be arranged in aligned, abutting relation. The V-grooves 11 require very little machining, and their surfaces need not be of a wear-resisting texture since there is no relative motion between them and the bars 13, 14.

A replaceable, semi-cylindrical bearing sleeve 16 may be attached to the saddle 12 in position to ride on the bar 14. A similar semi-cylindrical bearing sleeve 17 is attached to a shoe 18 associated with the saddle 12 in a manner to permit transverse movement relatively to the longitudinal axis of the bar 13. A gib 19 is provided between the shoe 18 and the saddle 12 for tightening the bearings 16 and 17 against the bars 14 and 13 simultaneously. An adjusting screw 20 enables adjustment of the gib 19, and a plate 21 fixes the shoe 18 against movement longitudinally of the bar 13. The semi-cylindrical sleeves 16, 17 may be made of any suitable bearing materials that will properly function with the steel bars 13 and 14.

Although the various features of the improved way bearing have been shown and described in detail to fully disclose one embodiment of the invention, it will be evident that numerous changes can be made in such details and certain features may be used without others without departing from the principles of the invention.

What is claimed is:

1. A bearing construction comprising in combination, a fixed support; a movable support; oppositely facing grooves in one of said supports; cylindrical bars within said grooves and fixed to the support containing said grooves; and oppositely facing bearings in said other support in sliding engagement with said cylindrical bars.

2. In a machine tool, a bed; oppositely facing V-grooves provided in said bed; cylindrical bars rigidly fixed to said bed within said grooves; a saddle on said bed; oppositely facing bearings associated with said saddle and adapted to slide on said bars; and an adjustable gib between said saddle and one of said slide bearings adapted simultaneously to tighten said slide bearings against said bars.

3. A bearing construction comprising in combination, a fixed support; oppositely facing grooves formed in said support; cylindrical bars fixed to said support within said grooves in a manner to provide uninterrupted way surfaces facing in opposite directions; a saddle mounted on said support for movement thereon; partial cylindrical bearings on said saddle and in bearing contact with said bars; and means for tightening both bearings against their respective bars simultaneously.

4. In a machine tool, a bed made from a soft cast iron having a high graphitic carbon content; grooves formed in said bed facing in opposite directions; hardened cylindrical bars located within, and extending throughout the length of said grooves; means for securing said bars to said bed in a manner to provide an uninterrupted partial cylindrical way throughout the length of said bars; a saddle mounted on said bed; bearings on said saddle adapted to ride on said bars; and means for tightening said bearings against said bars simultaneously.

EDWARD PAYSON BULLARD.

References Cited in the file of this patent

UNITED STATES PATENTS

| Number | Name | Date |
|---|---|---|
| 301,165 | Rogers | July 1, 1884 |
| 324,367 | Creelman | Aug. 18, 1885 |
| 1,673,163 | Schmelzkopf | June 12, 1928 |
| 2,083,682 | Balsiger | June 15, 1937 |